(12) United States Patent
Heinrich et al.

(10) Patent No.: US 9,107,462 B1
(45) Date of Patent: Aug. 18, 2015

(54) TEXTILE PATTERN OPTIMIZATION BASED ON FABRIC ORIENTATION AND BIAS CHARACTERIZATION

(71) Applicant: Google Inc., Mountain View, CA (US)

(72) Inventors: Mitchell Joseph Heinrich, San Francisco, CA (US); Carl Ferman Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 13/630,272

(22) Filed: Sep. 28, 2012

(51) Int. Cl.
| | | |
|---|---|---|
| *A41H 3/00* | (2006.01) | |
| *G06Q 30/06* | (2012.01) | |
| *A41H 3/04* | (2006.01) | |
| *G06F 17/50* | (2006.01) | |
| *G06T 19/20* | (2011.01) | |

(52) U.S. Cl.
CPC ............ *A41H 3/007* (2013.01); *G06Q 30/0621* (2013.01); *A41H 3/04* (2013.01); *G06F 17/5018* (2013.01); *G06F 2217/32* (2013.01); *G06Q 30/0643* (2013.01); *G06T 19/20* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 5,333,111 | A  * | 7/1994 | Chaiken et al. | 700/135 |
| 6,907,310 | B2 * | 6/2005 | Gardner et al. | 700/132 |
| 8,437,871 | B2 * | 5/2013 | Ko | 700/132 |
| 8,549,763 | B2 * | 10/2013 | Krawchuk | 33/17 R |
| 8,813,378 | B2 * | 8/2014 | Grove | 700/132 |
| 2005/0256686 | A1 * | 11/2005 | Stabelfeldt et al. | 703/6 |
| 2009/0222127 | A1 * | 9/2009 | Lind | 703/6 |
| 2010/0306082 | A1 * | 12/2010 | Wolper et al. | 705/27 |
| 2011/0298897 | A1 * | 12/2011 | Sareen et al. | 703/6 |

OTHER PUBLICATIONS

Umetani, Nobuyuki, et al. "Sensitive Couture for Interactive Garment Modeling and Editing" ACM Transactions on Graphics (TOG)—Proceedings of ACM SIGGRAPH'11, vol. 30, issue 4, article No. 90 (2011) available from <http://dl.acm.org/citation.cfm?id=1964985>.*

Liu, Yong-Jin, et al. "A Survey on CAD Methods in 3D Garment Design" Computers in Industry, vol. 61, pp. 576-593 (2010).*

Volino, Pascal, et al. "A Simple Approach to Nonlinear Tensile Stiffness for Accurate Cloth Simulation" ACM Transactions on Graphics, vol. 28, No. 4, article 105 (2009) available at <http://dl.acm.org/citation.cfm?id=1559762>.*

(Continued)

*Primary Examiner* — Kamini S Shah
*Assistant Examiner* — Jay B Hann
(74) *Attorney, Agent, or Firm* — Littenberg, David, Littenberg, Krumholz & Mentlik, LLP

(57) ABSTRACT

Aspects of the present disclosure provide computer implemented techniques to generate textile patterns that are optimized according to a predicted fabric behavior in different orientations. By orienting a "bias" of a fabric based on a number of textile panels being produced from the fabric, the textile panels can be configured to take full advantage of the fabric's properties. Orientation parameters for positioning the panels may be calculated to maximize the number of panels that can be cut from the fabric. Automatic adjustments may be made to the parameters by analyzing the fabric's constraints. The user can also input these constraints and an amount of desired stretch in specific areas of the fabric. A mechanism may also be employed to create a 3D model covered by the fabric in order to further adjust the fabric's orientation.

20 Claims, 5 Drawing Sheets

(56) References Cited

OTHER PUBLICATIONS

Gaurav Nilakantan, Michael Keefe, Travis A. Bogetti, Rob Adkinson, John W. Gillespie, Jr., International Journal of Solids and Structures, On the finite element analysis of woven fabric impact using multiscale modeling techniques, pp. 2300-2315, Dec. 15, 2009.

"Physical Properties for FEA Modeling", [online]. Retrieved Sep. 6, 2012 from the internet: <http://www.ocvreinforcements.com/Pages/Physical_Properties_for_FEA_Modeling.asp>, 2 pages.

* cited by examiner

TEXTILE PATTERN OPTIMIZATION BASED ON FABRIC ORIENTATION AND BIAS CHARACTERIZATION

BACKGROUND

In manufacturing, textile patterns are used to outline panels that may be cut out of pieces of fabric. The panels of fabric can be assembled into various items, such a garment for a consumer. Some patterns may be customized so that the assembled panels can fit specific measurements, shapes and sizes. However, many fabrics display different characteristics (e.g., tensile strength, shape retention, durability and aesthetics) when stretched and draped in different orientations.

BRIEF SUMMARY

Aspects of this disclosure may be advantageous for designing textile patterns that are optimized according an underlying fabric's behavior under various conditions. By orienting a bias of a fabric based on a number of panels that are being produced from the fabric, the panels can be configured to take full advantage of the fabric's properties. This technology may be useful in designing a variety of manufacturing articles that require a desired amount flex or fit in certain areas of a fabric, such as a garment, a mesh of a tennis racket or a shell of an airplane wing.

One aspect of the present technology provides a computer-implemented method. The method includes receiving a set of inputs for at least one component of a material, identifying body constraints corresponding to contours of a user, generating, using a processor, a three-dimensional model of the user wearing the material and determining an orientation of the material based on the body constraints and the three-dimensional model. The set of inputs may include tensile properties of the material.

In one example, the method may further include generating one or more textile patterns corresponding to the three-dimensional model of the user wearing the material. Determining the orientation of the material may further include predicting a set of behavioral reactions of the material based on an orientation of the material. Based on the set of behavioral reactions, the textile patterns may be aligned in a direction of a bias grain of the material. In another example, the textile patterns may be arranged in an optimum orientation for a given piece of the material, so as to maximize a yield obtained from the material. An area of the given piece of the material that underlies the textile patterns may be oriented at an angle. The angle may correspond to a direction of a bias grain of the material.

Another aspect of the present technology provides a system. The system includes a memory storing tensile properties for different materials and a processor coupled to the memory. The processor may be configured to receive a set of inputs for at least one component of a material, identify body constraints corresponding to contours of a user, generate a three-dimensional model of the user wearing the material and determine an orientation of the material based on the body constraints and the three-dimensional model. The set of inputs may include the tensile properties of the material stored in memory.

The processor may also be configured to generate one or more textile patterns corresponding to the three-dimensional model of the user wearing the material. The system may further include an output device coupled to the processor. In one example, the output device may be configured to print the one or more textile patterns so as to facilitate an assemblage of the garment using the material. In another example, the output device may be configured to directly cut the one or more textile patterns out of the given piece of the material.

Yet another aspect of the present technology provides a tangible, non-transitory computer-readable storage medium comprising instructions of a program. The program when executed by a processor may cause the processor to perform a method. The method includes receiving a set of inputs for at least one component of a material, identifying body constraints corresponding to contours of a user, generating a three-dimensional model of the user wearing the material and determining an orientation of the material based on the body constraints and the three-dimensional model. The set of inputs may include tensile properties of the material.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

The subject matter of the present disclosure provides computer implemented techniques to optimize textile patterns based on a fabric's behavior in different orientations. By orienting a "bias" of a fabric (e.g., a direction of the fabric where it is more elastic as compared to an on-grain direction) based on a number of panels that are being produced from the fabric, the panels can be configured to take full advantage of the fabric's properties. Orientation parameters for positioning the textile patterns along the bias may be calculated to maximize the number of panels that can be produced from a piece of fabric. Automatic adjustments can be made to the parameters by analyzing the fabric and several programmable constraints, such as a desired, size, length and elasticity in certain areas of the fabric. These adjustments may allow the fabric to be configured so that it can be more flexible in certain areas while remaining rigid in others. In some aspects, a user can input these constraints and an amount of desired stretch in specific areas of the fabric. A mechanism may also be employed to create a 3D model covered by the fabric in order to further adjust the fabric's orientation as necessary.

Figure 1:
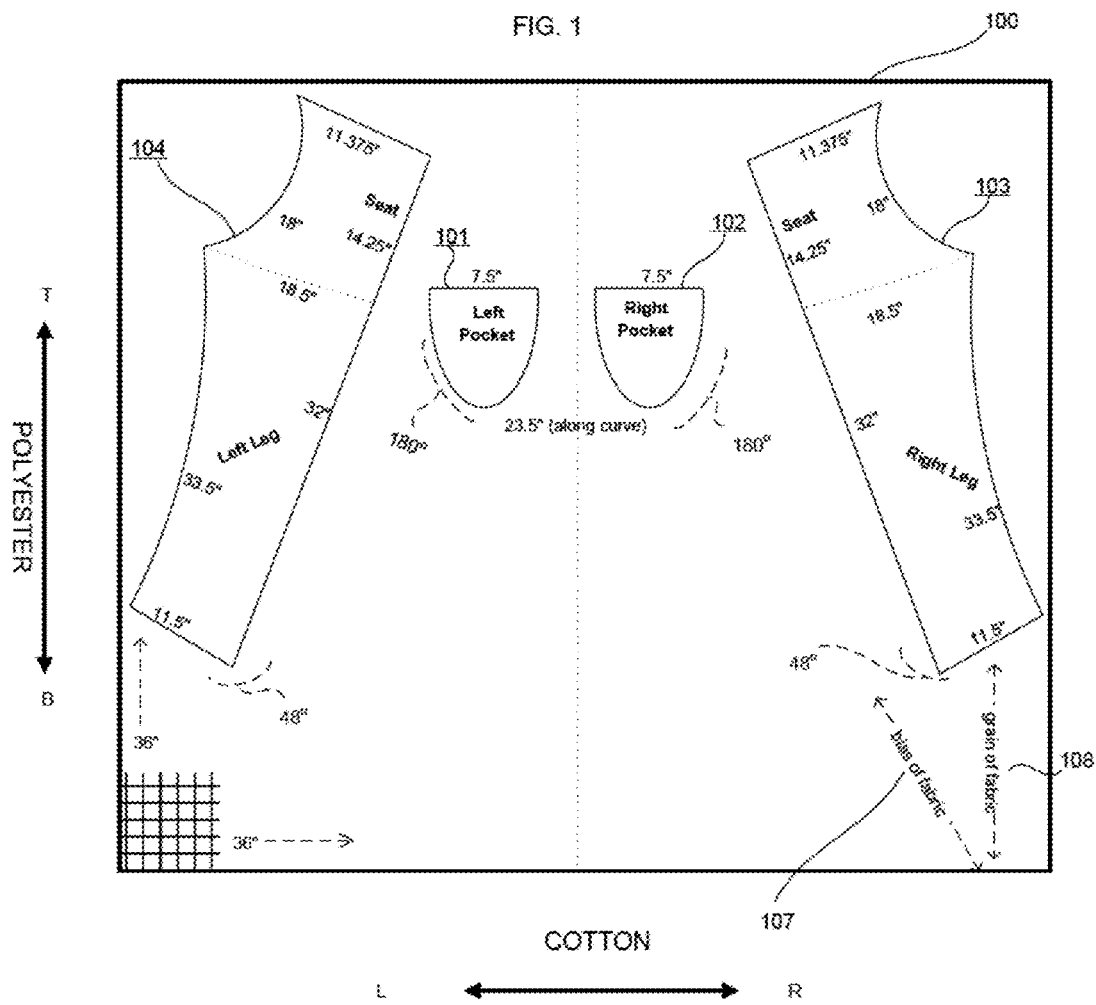
FIG. 1 is an example orientation of textile patterns in accordance with aspects of the disclosure.

FIG. 1 is example orientation of textile patterns 101-104. In this example, the textile patterns 101-104 comprise an outline of measurements for a garment, such as a pair of jeans, which may be assembled from a fabric 100. The fabric 100 can be constructed from two different types of threads going in different directions. For example, cotton threads of fabric 100 may run in a left to right direction while polyester threads are aligned from top to bottom. The threads in a given direction are typically parallel and spaced-apart a predetermined length from each other, such as depicted in a lower left corner of the fabric 100 in FIG. 1. Due to the fabric's composition, it may be more elastic along a direction of a bias of the fabric 107 as compared to a direction 108 on the grain.

The bias of fabric 107 may be at an angle to a lengthwise and crosswise grain of the fabric 100. The textile patterns 101-104 may be orientated along this bias in order to align parts of the pattern with areas of the fabric 100 that have more elasticity. For example, the textile patterns 101-104 may be positioned at an angle in relation to the bias of the fabric 107. As shown, the patterns for the left leg 104 and the right leg 103 may be positioned at a 48-degree angle in the direction of the bias of fabric 107. This may allow the legs of the jeans to have more elasticity than the left pocket 101 and right pocket 102, which are positioned directly on the grain of the fabric 108.

Figure 2:
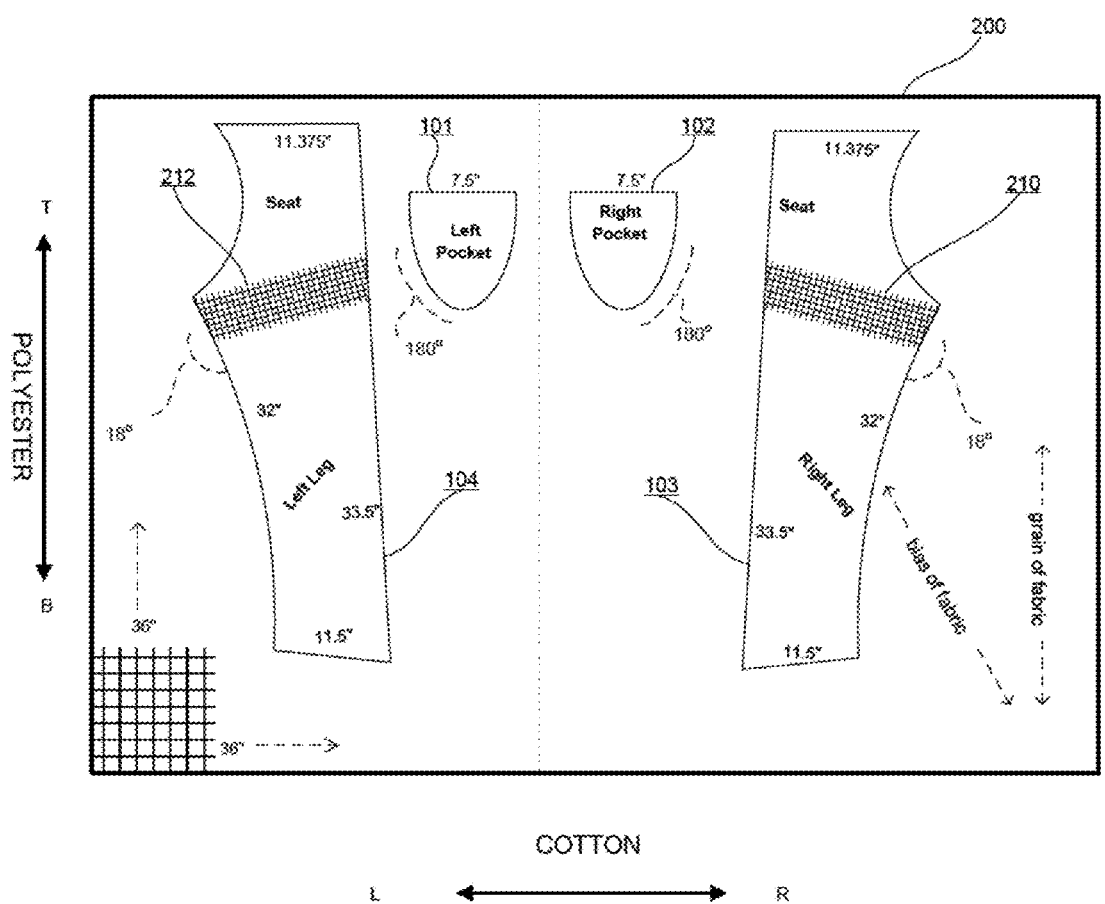
FIG. 2 is another example orientation of the textile patterns of FIG. 1 in accordance with aspects of the disclosure.

FIG. 2 is another example orientation of the textile patterns 101-104 of FIG. 1. According to aspects, advantages of the present disclosure can be achieved by adjusting fabric 200 that underlies the textile patterns 101-104 to create a type of metamaterial, which may be engineered to gain properties from its structure rather than its composition. For example, this can be a subtle change in an angle of the fabric weave with respect to a bias grain of the fabric 200. This may allow the fabric 200 to be designed with different tensile strengths in certain areas. For example, areas 210 and 212 of the underlying weaves of the fabric 200 of FIG. 2 have been slightly adjusted by 18 degrees in a direction of a bias of the fabric while the remaining fabric 200 is aligned on the grain. It may be known that specific parts of the textile patterns, for example, a space between a seat and thigh area, will be positioned in the angled areas 210 and 212 of the fabric 200 when the final pattern is sized and cut. The angle adjustments in the orientation of the weave at areas 210 and 212 may allow those sections of the fabric 200 to be more flexible than other areas.

Figure 3:
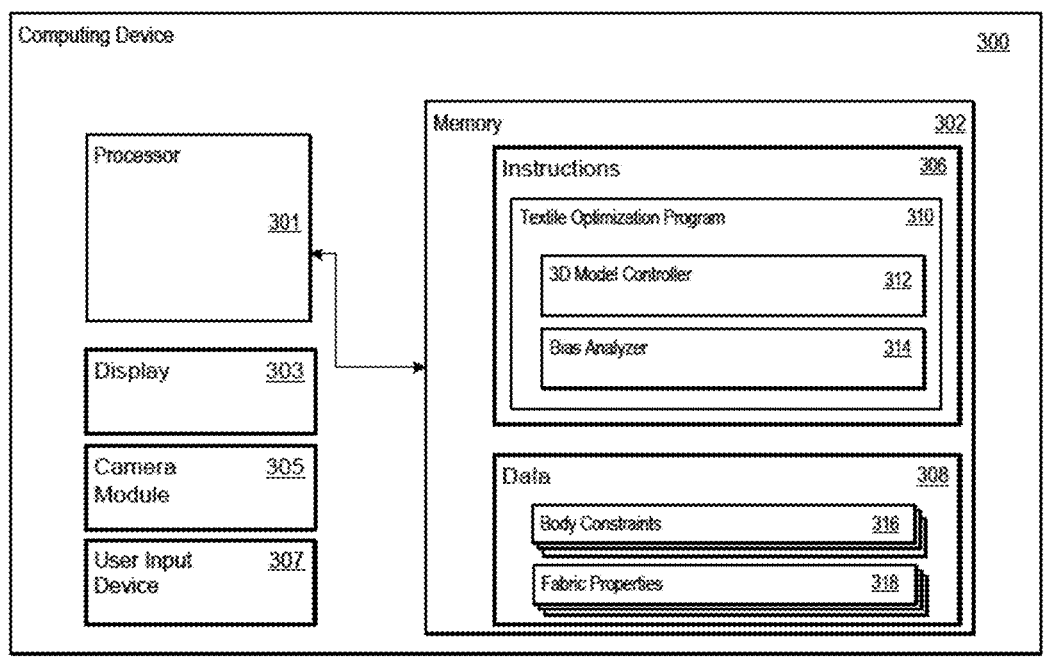
FIG. 3 is a block diagram depicting an example of a computing device in accordance with aspects of the disclosure.

FIG. 3 is a block diagram depicting an example of a computing device 300, which may be used to implement a method of optimizing textile patterns based on a fabric's behavior in different orientations. The computing device 300 may include a processor 301, a memory 302 and other components typically present in general purpose computers, such as a central processing unit (CPU), CD-ROM, hard drive, and a display device 303, for example, a monitor having a screen, a projector, a touch-screen, a small LCD screen, a television, or another device such as an electrical device that can be operable to display information processed by the processor 301, speakers, a modem and/or network interface device, user input device 307, such as a mouse, joystick, keyboard, touch screen or microphone, and all of the components used for connecting these elements to one another. Moreover, computers in accordance with the computing device 300 described herein may include devices capable of processing instructions and transmitting data to and from humans and other computers including general purpose computers, PDAs, network computers lacking local storage capability, set top boxes for televisions, and other networked devices.

The memory 302 may store instructions 306 and data 308 that are accessible by the processor 301. The processor 301 may execute the instructions 306 and access the data 308 to control the operations of the computing device 300.

The processor 301 may be a suitable processor, such as various commercially available general-purpose processors. Alternatively, the processor 304 may be a dedicated controller such as an application-specific integrated circuit ("ASIC"). Although FIG. 3 functionally illustrates the processor 301 and memory 302 as being within a single block, the processor 301 and memory 302 may actually comprise multiple processors and memories that may or may not be stored within the same physical housing. Accordingly, references to a processor, computer or memory may include references to a collection of processors, computers or memories that may or may not operate in parallel.

The memory 302 may be a type of tangible, non-transitory memory operative to store information accessible by the processor 301, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter of the present disclosure may include different combinations of the foregoing, whereby different portions of the instructions and data are stored on different types of media.

The data 308 can be retrieved, stored or modified by the processor 301 in accordance with the instructions 306. For instance, although the computing device 300 is not limited by a particular data structure, the data 308 can be stored in computer registers, in a relational database as a table having a plurality of different fields and records, or XML documents. The data 308 can also be formatted in a computer-readable format such as, but not limited to, binary values, ASCII or Unicode. Moreover, the data 308 can include information sufficient to identify relevant information, such as numbers, measurements, descriptive text, proprietary codes, pointers, and references to data stored in other memories, including other network locations, or information that is used by a function to calculate relevant data. For example, the data 308 can include body constraints 316 that may be encoded based on the instructions 306.

The body constraints 316 may impose restrictions on certain areas of a fabric, which may be configured to allow a predetermined amount of stretch or stiffness. For example, a user may use the computing device 300 to design a pair of jeans that stretch in certain areas like the seat, but not necessarily in other areas, such as the waist or ankle. In this regard, the body constraints 316 may create a relationship between the fabric and a surface upon which the fabric may be placed. For example, the body constraints 316 may also include body dimensions of a user that include preferred body measurements. In some aspects, the user may input the body constraints 316 using the user input device 307. For example, the user may use a keyboard attached to the computing device 300 to type in length, width, fit and size measurements that may appear on the display 303 for confirmation.

In some aspects, images of the user may be used determine the user's body constraints 316. For example, the images of the user may be analyzed to make a rough estimate of the user's height, width and size. As shown in FIG. 3, the computing device 300 may include a camera 305, which may be used to capture an image of the user. For example, the computing device 300 may be connected to a digital camera that may operate in conjunction with the computing device 300. The camera 305 may also operate in conjunction with other image capturing systems known in the arts, such as a camera in a mobile phone or other devices with image capture features. The computing device 300 is shown coupled to the memory 302, which can store the user images. The images can also be stored on a removable medium, such as a disk, tape, SD Card or CD-ROM, which can be connected to computing device 300. In one aspect, the images may be used to create a 3D model of the user, which can be adapted for different sizes.

The instructions 306 may be a set of instructions to be executed directly (such as machine code) or indirectly (such as scripts) by the processor 301. For example, the instructions 306 may be stored as computer code (e.g., software program) on a computer-readable medium. In that regard, the terms "instructions" and "programs" may be used interchangeably herein. The instructions 306 may be stored in object code format for direct processing by the processor 301, or in other computer language including scripts or collections of independent source code modules that are interpreted on demand or compiled in advance. Functions, methods and routines of the instructions are explained in more detail below.

In order to facilitate operations of the computing device 300 in generating optimized textile patterns for a piece of fabric, the memory 302 may further include a textile optimization program 310. The program 310 may determine an optimal orientation of a set of textile patterns within an area of a fabric in order to maximize the fabric's use. The program 310 may base this orientation on various factors, which may include tensile properties of the fabric. Although the program 310 is identified as a discrete module in connection with FIG. 3, the functionality of this module may overlap and/or exist in a fewer or greater number of modules than what is shown, with such modules residing at one or more processing devices, which may be geographically dispersed.

An advantage of the computing device 300 is that it can be configured to understand how a fabric may behave in different orientations. In that regard, the textile optimization program 310 may further include a bias analyzer module 314. The bias analyzer 314 may be used to analyze a bias grain of a fabric as the fabric is placed under different conditions. For example, by using techniques such as finite element analysis (FEA), the bias analyzer 114 may generate a behavioral model of the fabric that predicts how the fabric may react to different physical forces like stress, strain, orientation and gravity. FEA works by breaking down the fabric into a number of finite elements, which are each individual analyzed for their behavior under certain conditions. The computing device 300 may add up all the individual behaviors to predict the behavior of the actual fabric. These elements may include properties that describe the fabric, such as its weight, thickness, weave type, thread components, tensile strength, modulus of elasticity, shrinkage rate, etc.

The computing device 300 may store the fabric properties 318 in memory 302 for later processing. For example, a fabric library may be created to correlate the fabric properties 318 to facilitate an efficient search and retrieval of information regarding a particular fabric. In one aspect, the user may adjust the fabric properties 318 stored in memory 302, which may cause the bias analyzer 314 to automatically predict a new behavioral model for the fabric. For example, the user may adjust the fabric properties 318 through a keyboard attached to the computing device 300. The adjustments may be based, for example, on empirical knowledge regarding a specific fabric, published research papers or personal preferences.

The textile optimization program 310 may also include a 3D model controller 312, which enables a user to assemble a fabric over a 3D model to optimize the fabric's fit and appearance. For example, the 3D model controller 312 may size the fabric based on the body constraints 316 and draped it over the 3D model based on an analysis of the fabric properties 318 by the bias analyzer 314.

A presentation of the 3D model may be presented to the user on the display 303, which the user may manipulate using a user interface. For example, by employing a joystick that may be attached to the computing device 300, the user may further adjust the orientation of the fabric on the 3D model based on a user preference. This may cause the bias analyzer 314 to automatically predict a new behavioral model for the fabric. An outline of textile patterns in accordance with the 3D model may be mapped to a piece of the fabric. For example, an optimum orientation of the textile patterns on the piece of fabric may be calculated to avoid fabric waste and to maximum a yield that may be obtained from the fabric. In that regard, the textile patterns may be angled in different directions on the fabric based on the body constraints 316 and the 3D model.

According to aspects, the computing device 300 may output the textile patterns, for example, by printing the textile patterns using various digital textile-printing techniques. Orientation parameters (e.g., metric coordinates and measurements) for the textile patterns and the underlying fabric may be outputted, for example, on the display 303 of the computing device 300 or a readout from a printer attached to the computing device 300. Outputting means of the computing device 300 is further described below with respect to FIG. 4.

Figure 4:
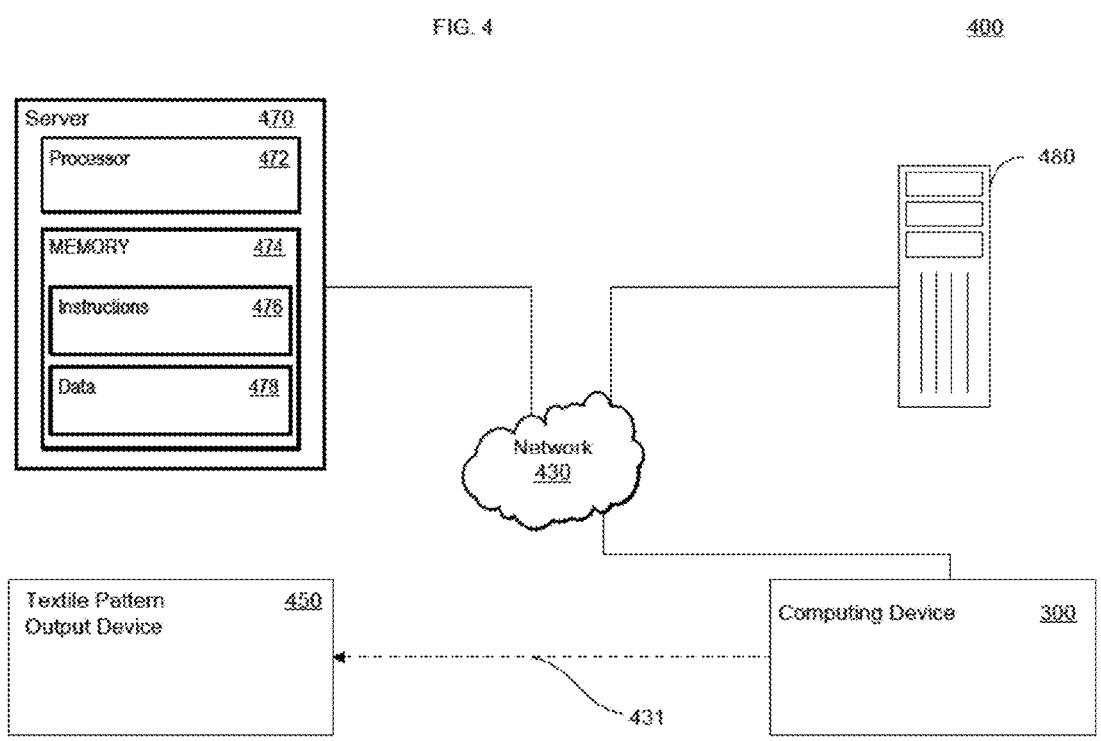
FIG. 4 is a diagram of a system including the computing device of FIG. 3 in accordance with aspects of the disclosure.

FIG. 4 is a diagram of a system 400 including the computing device 300 of FIG. 3. As discussed, the computing device 300 may be used to generate textile patterns that are optimized based on a fabric's behavior. Functionality of the computing device 300 may reside at one or more processing devices in the system 300, such as on a remote computing device, a server, or on some combination thereof.

The system 400 may include a number of servers 470 and 480 capable of communicating with the computing device 300 over a network 430. Each server 470 and 480 may be configured, similarly to computing device 300, with a processor 472, memory 474, instructions 476, and data 478. The memory 474 can store information accessible by the processor 472, including instructions 476 that can be executed by the processor 472. The memory 474 can also include data 478 that can be retrieved, manipulated or stored by the processor 472. The memory 474 may be a type of non-transitory computer readable medium capable of storing information accessible by the processor 472, such as a hard-drive, memory card, ROM, RAM, DVD, CD-ROM, write-capable, and read-only memories. The processor 472 can be a commercial available CPU. Alternatively, the processor 472 can be a dedicated controller, such as an ASIC, or other processing devices.

Servers 470 and 480 may be at one node of network 430 and capable of directly and indirectly communicating with other nodes of the network 430. For example, the servers 470 and 480 can include a web server that may be capable of communicating with computing device 300 via network 430 such that it uses the network 430 to transmit information to a client application. The servers 470 and 480 may also include a number of computers, e.g., a load balanced server farm, that exchange information with different nodes of the network 430 for the purpose of receiving, processing and transmitting data to client devices. In this instance, the client computers will typically still be at different nodes of the network 430 than the computers making up servers 470 and 480. Although only a few servers 470, 480 are depicted in FIG. 4, a typical system can include a large number of connected servers with each being at a different node of the network 480.

The network 430, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein is not limited to a particular manner of transmission of information. For example, in some aspects, information may be sent via a medium such as a disk, tape or CD ROM. Yet further, although some functions are indicated as taking place on a single server having a single processor, various aspects of the present disclosure may be implemented by a plurality of servers, for example, communicating information over the network 430.

As shown in FIG. 4, the system 400 may also include a textile pattern output device 450. For example, the computing device 300 may be connected to an output means that may operate in conjunction with the computing device 300. In one example, the output device 450 may be configured to directly cut the textile patterns out of a fabric through use of a computer controlled laser, water jet or fabric cutting system. In another example, printing of the textile patterns may be through the output device 450, which in this case can be an oversized graphics printer or other types of printing devices capable of handling sheets of paper upon which the textile patterns can be printed. In some aspects, the textile patterns may be printed directly onto a fabric using, for example, a digital textile printer connected to the computing device 300. In situations where the output device 450 may be remotely located from the computing device 300, a communication link 431 may be used to connect the computing device 300 to the output device 450. For example, the communication link 431 may be based on various wired and/or wireless commination standards used for transmitting information.

In addition to the components described above and illustrated in the figures, various operations will now be described. It should be understood that the following operations do not have to be performed in the precise order described below. Rather, various steps may be handled in a different order or simultaneously. Steps may also be added or omitted unless otherwise stated.

Figure 5:
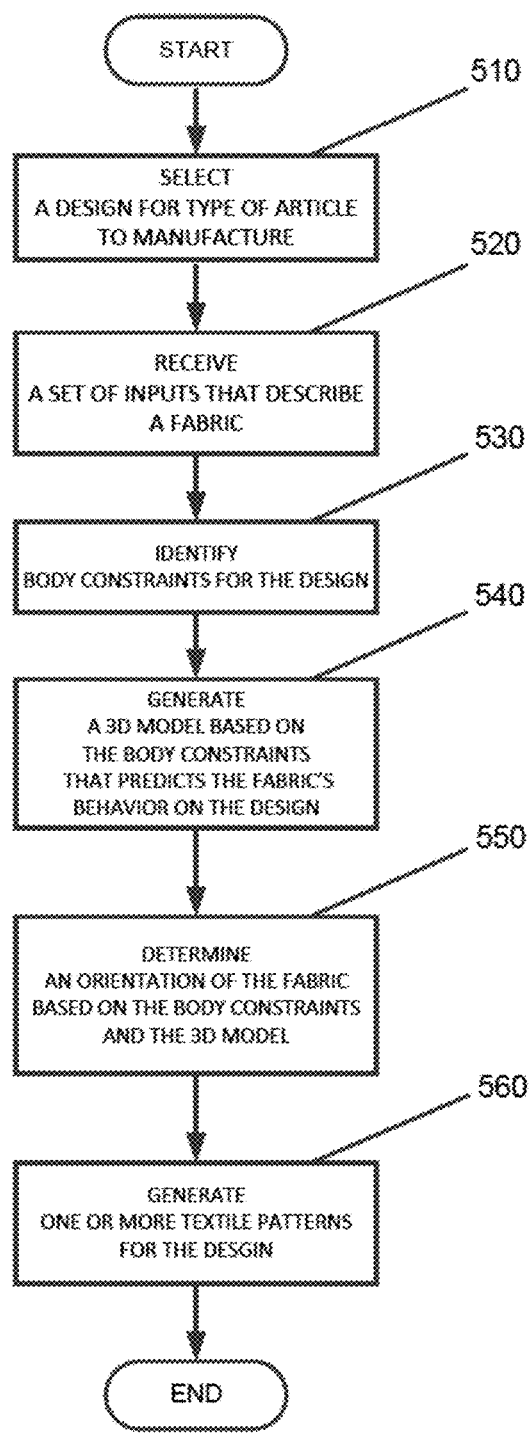
FIG. 5 is a flow diagram for a method in accordance with an aspect of the disclosure.

FIG. 5 is a flow diagram for a method 500, which may be used to optimize textile patterns for a fabric based on the fabric's behavior in different orientations.

In block 510, a type of article to manufacture may be selected. For example, a user may walk into a kiosk and select a design for a particular article to be manufactured, such as a garment or piece of clothing that can be worn by the user. For instance, the user may select the design from a range of pre-organized patterns or the user may input a specific style and type for the design. By way of example only, the user may input that they want to design a straight-leg pair of jeans. In some aspects, the user may be presented with a number of configuration parameter to further customize the design.

In block 520, a set of inputs may be received that describe a fabric, which may be used in creating the design selected in block 510. The inputs may be based on properties of the fabric. For example, the fabric properties may include the fabric's weight, thickness, tensile strength, elasticity, shrinkage rate, etc. According to aspects, the user may input these properties or select a fabric that has a known set of properties. For example, the user may access a fabric library to search and retrieve information regarding a particular fabric.

In block 530, a number of body constraints may be identified. In order for the design to be comfortably fitting, the body constraints may restrict certain areas of the fabric to allow for a certain amount of stretch or stiffness. According to aspect, the body constraints may create a relationship between the fabric and a surface upon which the fabric may be placed. In this regard, the body constraints may correspond to the contours of the user. In some aspects, the user may input their preferred fit and size measurements. Alternatively, the user's dimensions may be derived from an image of the user or some type of device or template that can detect the user's size.

In block 540, a 3D model based on the body constraints may be generated, for example, my using the computing device described with respect to FIG. 3. The 3D model of the fabric may be sized to the shape of the user based on the the body constraints. According to aspects, the 3D model may simulate the fabric's behavior as it is draped over the user in the shape of the design. In this regard, the fabric's behavior under different real-world forces may be predicted, for example, using such techniques as finite element analysis.

In block 550, an orientation of the fabric may be determined based on the body constraints and the 3D model. The fabric may be orientated over the 3D model in different directions to take full advantage of the predicted behavior of the fabric. For example, the fabric may be angle in relation to a bias of the fabric in order to create an amount of flex or fit in specific area of the design. In this regard, the body constraints from block 530 may detail an amount elasticity the user desires in certain areas of the design. One or more textile patterns may be generated that correspond to the design of the fabric on the 3D model, as shown in block 560. In some aspects, an optimal orientation of the textile patterns may be arranged within an area of the fabric so as to maximize the fabric's use, and thus avoiding fabric waste.

The above-described aspects of the present disclosure may be advantageous for optimizing textile patterns based on a fabric's behavior under various conditions. This may be useful in designing many industrial and retail manufacturing articles comprising a fabric where a certain amount elasticity in specific areas of the fabric is desired. Moreover, the various techniques and parameters disclosed within may be further reconfigured to engineer a fabric to have properties which it may not normally display.

As these and other variations and combinations of the features discussed above can be utilized without departing from the disclosure as defined by the claims, the foregoing description of the embodiments should be taken by way of illustration rather than by way of limitation of the present disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method, comprising:
   receiving a set of inputs for at least one component of a material, the set of inputs including tensile properties of the material;
   identifying body constraints corresponding to contours of a user;
   generating, using a processor, a three-dimensional model of the user wearing the material, wherein the material is sized based on the body constraints; and
   adjusting an orientation of a portion of the material with respect to a bias grain based on the body constraints and the three-dimensional model, the adjusting configured to manipulate a degree of tensile strength in the portion of the material.

2. The method of claim 1, further comprising generating one or more textile patterns corresponding to the three-dimensional model of the user wearing the material.

3. The method of claim 2, wherein the textile patterns comprise an outline of a garment.

4. The method of claim 2, wherein determining the orientation further comprises predicting a set of behavioral reactions of the material based on an orientation of the material.

5. The method of claim 4, further comprising aligning, based on the set of behavioral reactions, the textile patterns in a direction of a bias grain of the material.

6. The method of claim 2, further comprising arranging the textile patterns in an optimum orientation for a given piece of the material so as to maximize a yield obtained from the material.

7. The method of claim 6, further comprising orienting, at an angle, an area of the given piece of the material that underlies the textile patterns, the angle corresponding to a direction of a bias grain of the material.

8. The method of claim 4, further comprising:
receiving a second set of inputs for the at least one component of the material, the second set of inputs including a composition of components for the material;
predicting a second set of behavioral reactions, based on the second set of inputs, the second set of behavioral reactions corresponding to an elasticity of each component of the material; and
automatically adjusting the orientation of the material in response to the second set of reactions.

9. A system, comprising:
a memory storing tensile properties for different materials; and
a processor coupled to the memory, the processor being configured to:
receive a set of inputs for at least one component of a material, the set of inputs including the tensile properties of the material stored in memory;
identify body constraints corresponding to contours of a user;
generate a three-dimensional model of the user wearing the material, wherein the material is sized based on the body constraints; and
adjust an orientation of a portion of the material with respect to a bias grain based on the body constraints and the three-dimensional model, the adjusting configured to manipulate a degree of tensile strength in the portion of the material.

10. The system of claim 9, wherein the processor is further configured to generate one or more textile patterns corresponding to the three-dimensional model of the user wearing the material.

11. The system of claim 10, wherein, to determine the orientation of the material, the processor is further configured to predict a set of behavioral reactions of the material based on an orientation of the material.

12. The system of claim 11, wherein the processor is further configured to align the textile patterns in a direction of a bias grain of the material based on the predictions.

13. The system of claim 10, wherein the processor is further configured to arrange the textile patterns in an optimum orientation for a given piece of the material so as to maximize a yield obtained from the material.

14. The system of claim 13, wherein the processor is further configured to orient, at an angle, an area of the given piece of the material that underlies the textile patterns, the angle corresponding to a bias grain of the material.

15. The system of claim 10, further comprising an output device coupled to the processor, the output device being configured to print the one or more textile patterns so as to facilitate an assemblage of the garment using the material.

16. The system of claim 10, further comprising an output device coupled to the processor, the output device being configured to directly cut the one or more textile patterns out of the given piece of the material.

17. A tangible, non-transitory computer-readable storage medium comprising instructions of a program, when executed by a processor, cause the processor to perform a method, the method comprising:
receiving a set of inputs for at least one component of a material, the set of inputs including tensile properties of the material;
identifying body constraints corresponding to contours of a user;
generating, using a processor, a three-dimensional model of the user wearing the material, wherein the material is sized based on the body constraints; and
adjusting an orientation of a portion of the material with respect to a bias grain based on the body constraints and the three-dimensional model, the adjusting configured to manipulate a degree of tensile strength in the portion of the material.

18. The tangible computer-readable storage medium of claim 17, wherein the method further comprising generating one or more textile patterns corresponding to the three-dimensional model of the user wearing the material.

19. The tangible computer-readable storage medium of claim 17, wherein the method further comprising predicting a set of behavioral reactions of the material based on an orientation of the material.

20. The tangible computer-readable storage medium of claim 17, wherein the method further comprising arranging the textile patterns in an optimum orientation for a given piece of the material so as to maximize a yield obtained from the material.

* * * * *